United States Patent
Ito et al.

(10) Patent No.: US 7,823,459 B2
(45) Date of Patent: Nov. 2, 2010

(54) LOAD DETECTION DEVICE

(75) Inventors: Koji Ito, Yatomi (JP); Hideki Kawabata, Chita-gun (JP); Muneto Inayoshi, Nagoya (JP); Kan Ichihara, Kariya (JP); Hiroyuki Fujii, Kariya (JP); Yoshimasa Asano, Anjo (JP); Naoka Kawajiri, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 69 days.

(21) Appl. No.: 12/262,418

(22) Filed: Oct. 31, 2008

(65) Prior Publication Data

US 2009/0126500 A1    May 21, 2009

(30) Foreign Application Priority Data

Nov. 21, 2007    (JP)    ............................. 2007-301579

(51) Int. Cl.
*G01B 7/16* (2006.01)
(52) U.S. Cl. ................ 73/781; 73/862.381; 73/862.391
(58) Field of Classification Search ........... 73/760–860, 73/862.381–862.391
See application file for complete search history.

(56) References Cited

U.S. PATENT DOCUMENTS

| | | | |
|---|---|---|---|
| 6,242,701 B1 | 6/2001 | Breed et al. | |
| 6,571,647 B1* | 6/2003 | Aoki et al. ............. | 73/862.381 |
| 6,684,718 B2* | 2/2004 | Muraishi ............... | 73/862.474 |
| 6,755,571 B2* | 6/2004 | Kajiyama ................... | 384/276 |
| 7,155,981 B2 | 1/2007 | Matsuura et al. | |
| 7,189,931 B2* | 3/2007 | Hida et al. .................. | 177/144 |
| 7,559,249 B2* | 7/2009 | Nakano et al. ................ | 73/781 |
| 2006/0075832 A1* | 4/2006 | Blakesley et al. ...... | 73/862.391 |
| 2008/0098822 A1* | 5/2008 | Sakamoto et al. ............. | 73/781 |
| 2008/0098823 A1 | 5/2008 | Sumi et al. | |
| 2008/0127752 A1 | 6/2008 | Nakano et al. | |
| 2008/0156103 A1 | 7/2008 | Nakano et al. | |

(Continued)

FOREIGN PATENT DOCUMENTS

JP    2003-83707    3/2003

OTHER PUBLICATIONS

U.S. Appl. No. 11/978,626, filed Oct. 30, 2007, Satohiko Nakano, et al.

(Continued)

*Primary Examiner*—Max Noori
(74) *Attorney, Agent, or Firm*—Oblon, Spivak, McClelland, Maier & Neustadt, L.L.P.

(57) ABSTRACT

A load detection device includes a strain generating body having first and second holes at first and second ends of the strain generating body, a strain gauge attached on the strain generating body, first and second fixing members having first and second middle shaft portion press-fitted into the first and second holes, respectively, and having first and second end shaft portions protruding from the first and second middle shaft portions, respectively, a bracket member having first fixing portion including a first fixing hole into which the first end shaft portion is press-fitted, and a second fixing portion, integrally connected to the first fixing portion and including a second fixing hole into which the second end shaft portion is inserted with a clearance therebetween, a press-fit fixing member press-fitted onto the second end shaft portion, and a connecting shaft integrally connected to the strain generating body.

13 Claims, 6 Drawing Sheets

U.S. PATENT DOCUMENTS

2008/0229841 A1    9/2008    Matsukawa et al.

OTHER PUBLICATIONS

U.S. Appl. No. 11/930,488, filed Oct. 31, 2007, Satohiko Nakano, et al.

U.S. Appl. No. 11/976,715, filed Oct. 26, 2007, Kazunori Sakamoto, et al.

U.S. Appl. No. 12/203,452, filed Sep. 3, 2008, Hideki Kawabata, et al.

U.S. Appl. No. 11/976,716, filed Oct. 26, 2007, Chiaki Sumi, et al.

U.S. Appl. No. 12/203,452, filed Sep. 3, 2008, Kawabata, et al.

\* cited by examiner

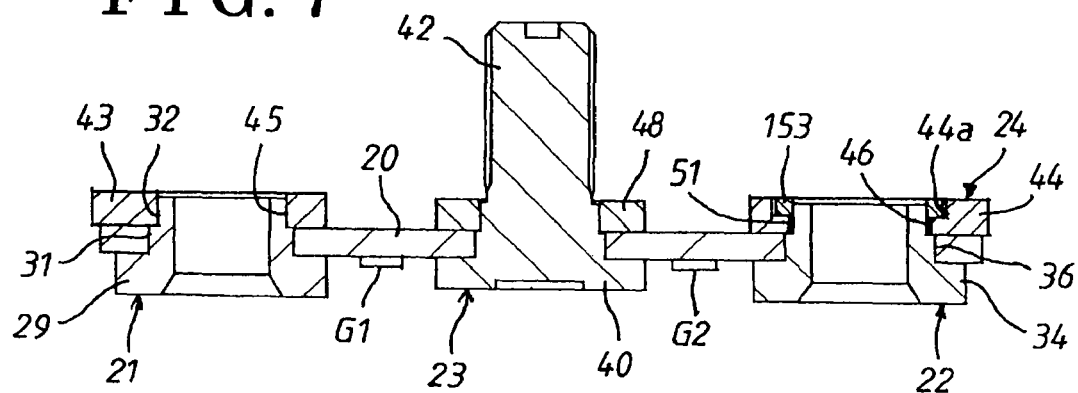
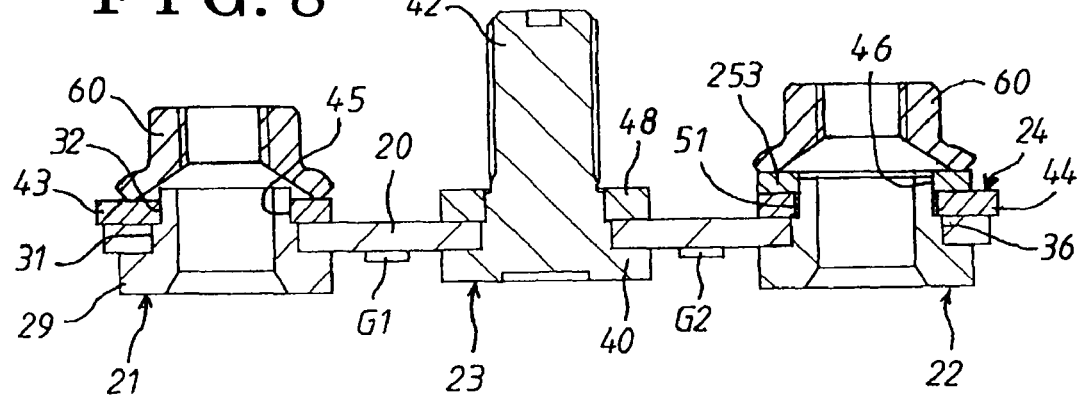

LOAD DETECTION DEVICE

This application is based on and claims priority under 35 U.S.C. §119 to Japanese Patent Application 2007-301579, filed on Nov. 21, 2007, the entire contents of which is incorporated herein by reference.

FIELD OF THE INVENTION

The present invention relates to a load detection device adapted to a seat for a vehicle.

BACKGROUND

There exists various load detection devices for a vehicle seat for detecting a load applied by an occupant, to be adapted to a vehicle having an airbag for protecting an occupant seated on the vehicle seat, in order to appropriately adjust gas generation in response to weight of the occupant and in order not to actuate an airbag firing pin in a case where the occupant is a child. For example, disclosed in JP2003-83707A is a strain sensor, in which a bending stress applied to a strain detecting element does not change, thereby enhancing output accuracy.

The strain sensor disclosed in JP2003-83707A is configured so that inner surfaces of a first upper washer contacting an upper surface of a sensor board and a first lower washer contacting a lower surface of the sensor board are press-fitted into a first cylinder, which is press-fitted into a first fixing hole formed at the sensor board, and so that inner surfaces of a second upper washer contacting the upper surface of the sensor board and a second lower washer contacting the lower surface of the sensor board are press-fitted into a second cylinder, which is press-fitted into a second fixing hole formed at the sensor board, and so that inner surfaces of a detector upper washer contacting the upper surface of the sensor board and a detector lower washer contacting the lower surface of the sensor board are press-fitted into a detecting cylinder, which is press-fitted into a detecting hole 14 formed on the sensor board.

As the strain sensor disclosed in JP2003-83707A is configured from the first washer and the second washer, which are separate and independent from each other, two pairs of washers are capable of being press-fitted into the first and second fixing holes of the sensor board via the first and second cylinders, respectively. However, in a case where the first and second washers are integrally connected by means of an attachment portion for attaching, for example, an amplifier thereon, as illustrated in FIG. 2, the two fixing portions (the first and second washers) may not to be press-fitted into the respective holes in the manner disclosed in JP2003-83707A because of a dimensional difference between the two fixing portions and the fixing holes formed at the sensor board or because of a dimensional error. Further, if the two fixing portions are forced to be press-fitted into the corresponding fixing holes, an internal stress is generated at the sensor board and the load may not be accurately detected.

A need thus exists to provide a load detection device which is not susceptible to the drawback mentioned above.

SUMMARY OF THE INVENTION

According to an aspect of the present invention, a load detection device, adapted to a seat for a vehicle, interposed between a seat supporting member for supporting the seat and a mounting member for mounting the seat supporting member on a floor of the vehicle and measuring a load applied by an occupant seated on the seat for the vehicle, the load detection device includes a strain generating body having a first hole at a first end of the strain generating body and a second hole at a second end of the strain generating body, a strain gauge attached on the strain generating body, a first fixing member having a first middle shaft portion, which is press-fitted into the first hole, and a first end shaft portion, which protrudes from the first middle shaft portion, the first fixing member adapted to be connected to either one of the seat supporting member and the mounting member, a second fixing member having a second middle shaft portion, which is press-fitted into the second hole, and a second end shaft portion, which protrudes from the second middle shaft portion, the second fixing member adapted to be connected to either one of the seat supporting member and the mounting member, a bracket member having a first fixing portion, including a first fixing hole, at a first end of the bracket member and a second fixing portion, integrally connected to the first fixing portion and including a second fixing hole, at a second end of the bracket member, the first end shaft portion being press-fitted into the first fixing hole and the second end shaft portion being inserted into the second fixing hole with a clearance therebetween, a press-fit fixing member press-fitted onto the second end shaft portion for holding the second fixing portion of the bracket member between the press-fit fixing member and the second fixing member, and a connecting shaft integrally connected to the strain generating body between the first hole and the second hole of the strain generating body and adapted to be connected to the other of the seat supporting member and the mounting member.

According to another aspect of the present invention, a load detection device includes a strain generating body having a first hole at a first end of the strain generating body and a second hole at a second end of the strain generating body, a strain gauge attached on the strain generating body, a first fixing member having a first middle shaft portion, which is press-fitted into the first hole, and a first end shaft portion, which protrudes from the first middle shaft portion, a second fixing member having a second middle shaft portion, which is press-fitted into the second hole, and a second end shaft portion, which protrudes from the second middle shaft portion, a bracket member having a first fixing portion, including a first fixing hole, at a first end of the bracket member and a second fixing portion, integrally connected to the first fixing portion and including a second fixing hole, at a second end of the bracket member, the first end shaft portion being press-fitted into the first fixing hole and the second end shaft portion being inserted into the second fixing hole with a clearance therebetween, a press-fit fixing member press-fitted onto the second end shaft portion for holding the second fixing portion of the bracket member between the press-fit fixing member and the second fixing member, and a connecting shaft integrally connected to the strain generating body between the first hole and the second hole of the strain generating body.

BRIEF DESCRIPTION OF THE DRAWINGS

The foregoing and additional features and characteristics of the present invention will become more apparent from the following detailed description considered with the reference to the accompanying drawings, wherein:

FIG. 7 is a view illustrating a state where the load detection device of a second embodiment is assembled; and FIG. 8 is a view illustrating a state where the load detection device of a third embodiment is assembled.

DETAILED DESCRIPTION

Embodiments of a load detection device adapted to, for example, a seat for a vehicle according to the present invention will be described below in accordance with the attached drawings. A load detection device 10 measures a load applied by an occupant seated on a vehicle seat 11 illustrated in FIG. 1. Additionally, directions "up (upward)", "down (downward)", "left", "right", "front (forward)" and "back (backward)" are determined on the basis of a perspective of the occupant seated on the vehicle seat 11.

First Embodiment

Figure 1:
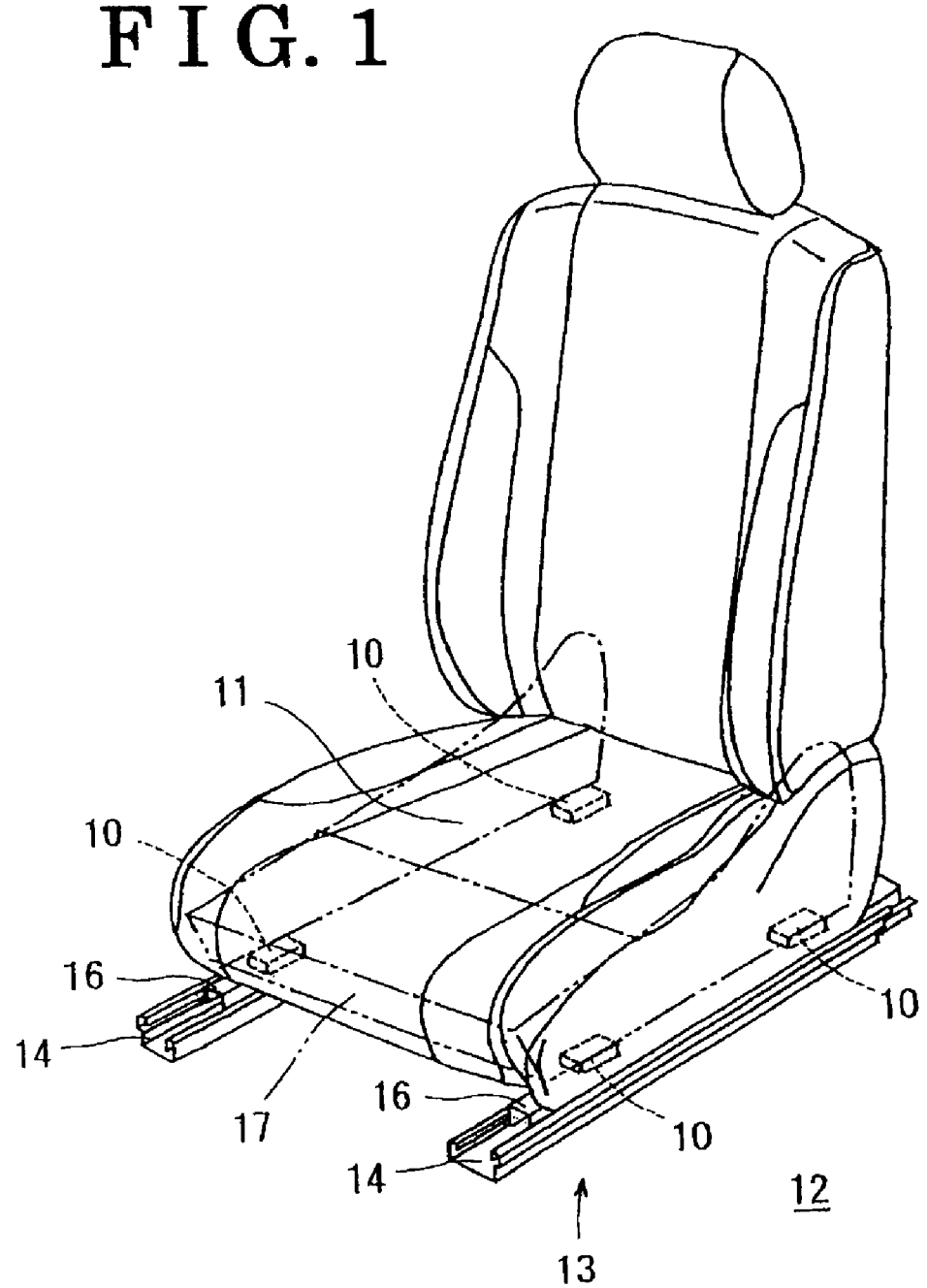
FIG. 1 is a perspective view illustrating a seat for a vehicle having a load detection device.
Figure 6:
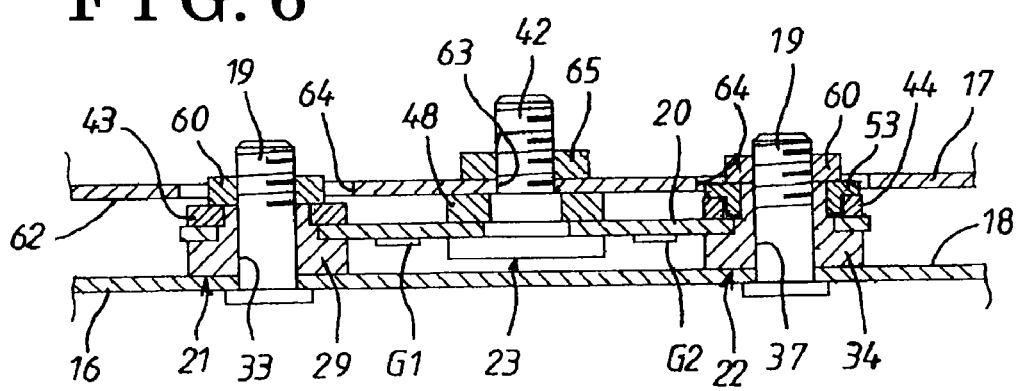
FIG. 6 is a view illustrating a state where the load detection device is assembled to a seat frame.

As illustrated in FIGS. 1 and 6, a seat slide apparatus 13, which fixes the vehicle seat 11 on a vehicle floor 12 so that a position of the vehicle seat 11 is adjustable, includes a pair of lower rails 14 fixed on the vehicle floor 12 and extending in a front-rear direction of the vehicle, a pair of upper rails 16 movably supported by the pair of the lower rails 14, respectively, and the like. A seat frame 17, which serves as a seat supporting member, which supports a seat cushion of the vehicle seat 11, is fixed at attachment surfaces 18 formed on upper surfaces of the pair of the upper rails 16, serving as a mounting member, at a lower surface of the seat frame 17, or at four corners of the seat frame 17 in a front-rear direction and left-right direction thereof, via the load detection devices 10. Each load detection device 10 is fixed on each end portion of the attachment surface 18 formed on each of the pair of upper rails 16. Further, a pair of fixing shafts 19 (i.e. first and second fixing shafts 19) for fixing the load detection device 10 at the attachment surface 18 of each upper rail 16 is fixed at each end portion of each of the pair of upper rails 16 so as to extend in a vertical direction and so that the pair of fixing shafts 19 is spaced away from the other pair of fixing shafts 19 for a predetermined distance in the front-rear direction of the vehicle. The pair of lower rails 14 also serves as the mounting member. The floor mounting member is a member for mounting the seat on the floor 12 of the vehicle.

Figure 2:
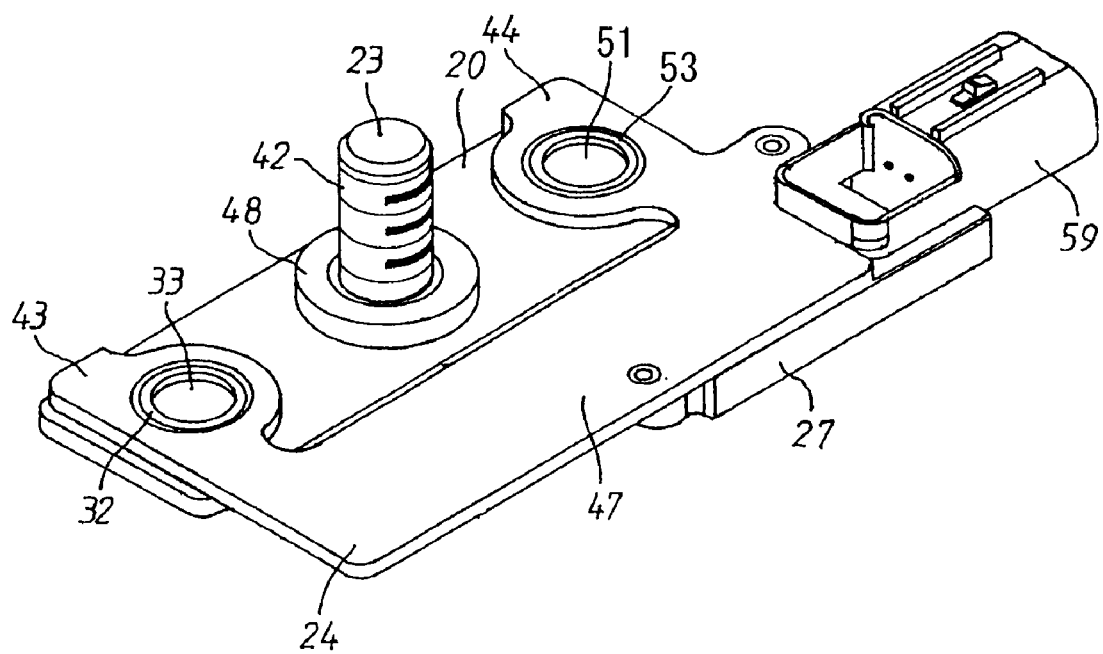
FIG. 2 is a perspective view of the load detection device.
Figure 3:
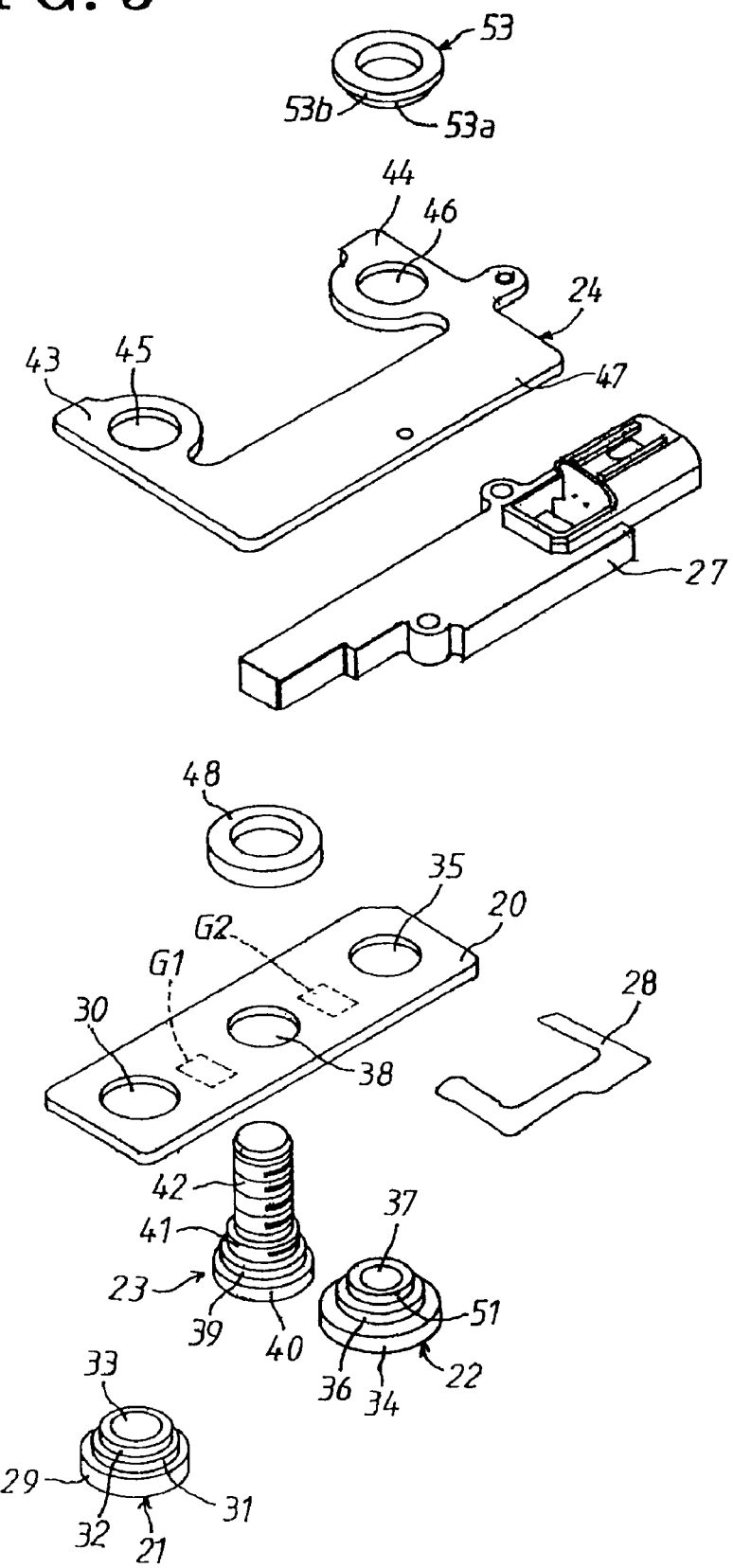
FIG. 3 is an exploded view of the load detection device.
Figure 4:
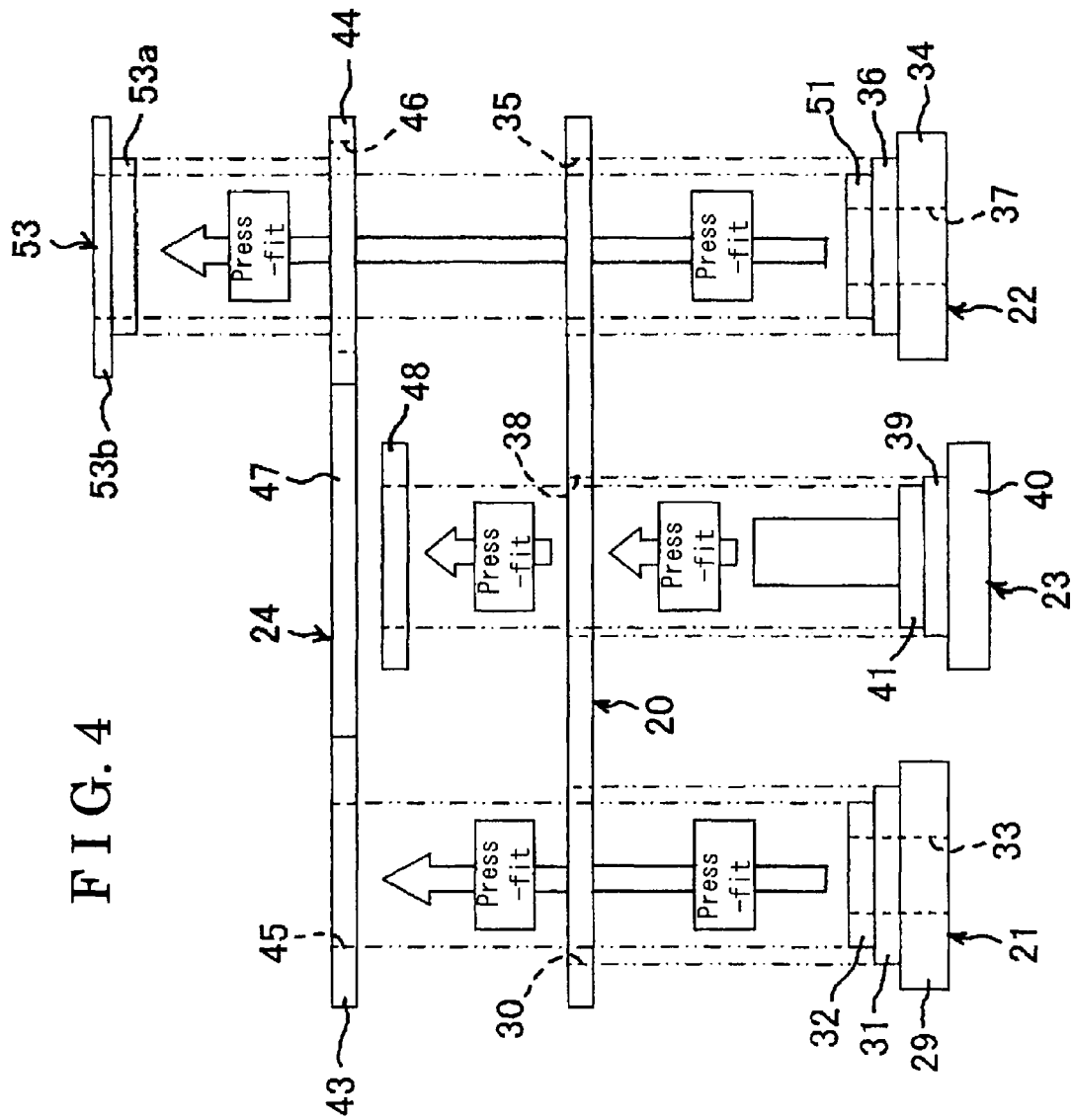
FIG. 4 is a view illustrating a process of assembling a lower bush and upper bracket of a first embodiment to a strain generating body.

As illustrated in FIGS. 2 and 3, the load detection device 10 includes a strain generating body 20 (i.e. plate) formed in a substantially rectangular plate-shape, a first and second strain gauges G1 and G2 attached on a surface, for example, on a lower surface, of the strain generating body 20, a first and second lower bushes 21 and 22 for fixing the strain generating body 20 on the attachment surface 18 of the upper rail 16 at both end portions of the strain generating body 20 in the longitudinal direction thereof, a connecting shaft 23 serving as a connecting member, fixed at a substantially center portion of the strain generating body 20 in a vertical direction relative to the strain generating body 20 and then fixed at the strain generating body 20 at the seat frame 17 of the vehicle seat 11, an upper bracket 24 (an example of a bracket member) fixed on an upper surface of the strain generating body 20 at both end portions (first and second ends) of the upper bracket 24 in a longitudinal direction thereof, an amplifier 27 (a signal processing unit) arranged in parallel to the strain generating body 20 at a lower surface of an attachment portion 47 of the upper bracket 24 and amplying a signal outputted from the first and second strain gauges G1 and G2, a flexible printed circuit board 28 (a FPC board 28) connected to each of the first and second strain gauges G1a and G2 and the amplifier 27, and the like. The strain generating body 20 is made from, for example, a plate member which is flexible and deformed when a load is applied thereto. A connector 59 connects a communication line for transmitting an output of the amplifier 27 to an electronic control unit. Hereinafter, the load detection device 10 will be described below with the first lower bush 21 as an example of a first fixing member and the second lower bush 22 as an example of a second fixing member.

Figure 5:
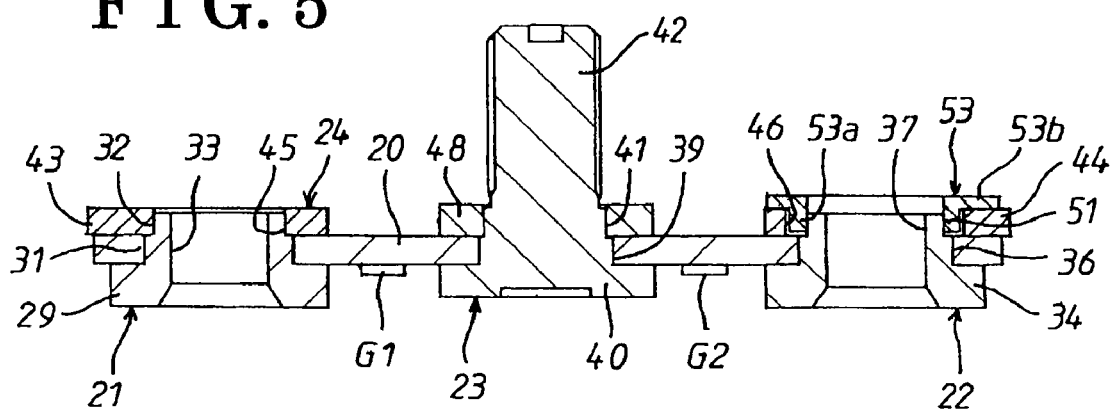
FIG. 5 is a view illustrating a state where the load detection device is assembled.

As illustrated in FIG. 2 or FIG. 5, the second lower bush 22 is formed to have substantially the same shape as the first lower bush 21. Further, the first lower bush 21 includes a round-shaped first base portion 29 having a predetermined thickness, a first middle shaft portion 31, which is provided on the first base portion 29 so as to protrude in an axial direction thereof and which is press-fitted into a first end hole 30 (a first hole) provided at one end portion (a first end) of the strain generating body 20, a first end shaft portion 32 provided on the first middle shaft portion 31 so as to protrude in the axial direction of the first lower bush 21, and a first attachment hole 33 passing through a center of the first lower bush 21 in the axial direction thereof Similarly, the second lower bush 22 includes a round-shaped second base portion 34 having the predetermined thickness, a second middle shaft portion 36, which is provided on the second base portion 34 so as to protrude in an axial direction thereof and which is press-fitted into a second end hole 35 (a second hole) provided at the other end portion (a second end) of the strain generating body 20, a second end shaft portion 51 provided on the second middle shaft portion 36 so as to protrude in the axial direction of the second lower bush 22, and a second attachment hole 37 passing through a center of the second lower bush 22 in the axial direction thereof The first end hole 30 and the second end hole 35 are provided at end portions of the strain generating body 20, respectively, so as to be spaced away from each other for the same predetermined distance as between the first and second fixing shafts 19. The first and second middle shaft portions 31 and 36 of the first and second lower bushes 21 and 22 are press-fitted into the first and the second end holes 30 and 35, respectively, until the first and second base portions 29 and 34 of the respective first and second lower bushes 21 and 22 contact the lower surface of the strain generating body 20. A center hole 38 is formed at a substantially center portion of the strain generating body 20. A middle shaft portion 39 of the connecting shaft 39 is press-fitted into the center hole 38. A flange 40 having a thickness thinner than the first and second base portions 29 and 34 of the respective first and second lower bushes 21 and 22 is formed on one end portion of the connecting shaft 23. The flange 40 contacts the lower surface of the strain generating body 20 when the connecting shaft 39 is press-fitted into the center hole 38 of the strain generating body 20. An end shaft portion 41 is provided on a surface of the middle shaft portion 39 facing opposite from the flange 40 so as to extend in an axial direction of the connecting shaft 23. Further, a fixing screw portion 42 is provided on one end surface of the end shaft portion 41 facing opposite from the middle shaft portion 39 so as to extend in the axial direction of the connecting shaft 23. The connecting shaft 23 is fixed on the strain generating body 20 so as to sandwich the strain generating body 20 by the flange portion 40 of the connecting shaft 23 and a ring member 48 in a manner where the middle shaft portion 39 of the connecting shaft 23 is press-fitted into the center hole 38 of the strain generating body 20 and then the ring member 48 is press-fitted onto the end shaft portion 41 of the connecting shaft 23.

Hence, in a case where the load acts on the strain generating body 20 via the connecting shaft 23, the strain generating body 20 is deformed while the end portions thereof are supported by the first and the second lower bushes 21 and 22, respectively. When the strain generating body 20 is deformed, a strain is generated on the surfaces of the strain generating body 20 between the first lower bush 21 and the connecting shaft 23, and between the second lower bush 22 and the connecting shaft 23 in response to the load applied to the strain generating body 20. More specifically, when the strain generating body 20 is deformed, a compressive strain is generated on the surface of the strain generating body 20 towards the first and second lower bushes 21 and 22 and a tensile strain is generated towards the connecting shaft 23 in proportional to a level of the load applied to the strain generating body 20. In order to detect the compressive strain and the tensile strain, the first and second strain gauges G1 and G2, each of which has two elements forming half-bridges, respectively, is attached between the center portion and each of the end portions of the strain generating body 20, respectively. More specifically, the first and second strain gauges G1 and G2 are attached on the lower surface of the strain generating body 20 between the connecting shaft 23 and the first lower bush 22, and between the connecting shaft 23 and the second lower bush 22, respectively. A full-bridge is formed by each of the half bridges of the first and second strain gauges G1 and G2, so that an electrical signal is outputted to the amplifier 27 in proportional to a deformation of the strain generating body 20, i.e. in proportional to the load acts on the strain generating body 20. In the above-described embodiment, the strain generating body 20 is arranged so that the compressive strain is generated towards the first and second lower bushes 21 and 22 and the tensile strain is generated towards the connecting shaft 23. However, the strain generating body 20 may be modified so that the compressive strain or the tensile strain is generated only towards the first and second lower bushes 21 and 22, or so that the compressive strain or the tensile strain is generated only towards the connecting shaft 23.

The upper bracket 24 is fixed on the upper surface of the strain generating body 20 at the both end portions of the strain generating body 20 by a first and second end fixing portions 43 and 44 (a first and second fixing portions). In other words, the first and second end fixing portions 43 and 44 are provided at the end portions of the upper bracket 24, respectively. Further, the first and second end fixing portions 43 and 44 are integrally connected by means of the attachment portion 47. The attachment portion 47 of the upper bracket 24 is arranged so as to extend along one side of the strain generating body 20, i.e. along a longitudinal direction of the strain generating body 20.

The first end shaft portion 32 of the first lower bush 21 protruding from the upper surface of the strain generating body 20 is press-fitted into a first fixing hole 45 formed on the first end fixing portion 43, thereby the one end portion of the strain generating body 20 is held between the first end fixing portion 43 of the upper bracket 24 and the first base portion 29 of the first lower bush 21. A second fixing hole 46 formed at the second end fixing portion 44 has an internal diameter greater than an internal diameter of the first fixing hole 45 formed on the first end fixing portion 43. The second end shaft portion 51 of the second lower bush 22 protruding from the upper surface of the strain generating body 20 is loosely fitted into the second fixing hole 46 with forming a clearance therebetween.

A cylindrical portion 53a of a washer 53 having a flange 53b (a flange portion) is inserted into the clearance between the second fixing hole 46 having larger internal diameter than the first fixing hole 45 of the first end fixing portion 43 and the second end portion 51 of the second lower bush 22 from above of the upper bracket 24, so that an inner circumferential surface of the cylindrical portion 53a is press-fitted onto an outer circumferential surface of the second end shaft portion 51 of the second lower bush 22. The washer 53 is used in this embodiment as an example of a press-fit fixing member. The cylindrical portion 53a of the washer 53 is press-fitted into the clearance up to a position at which the flange 53b of the washer 53 contacts an upper surface of the upper bracket 24. When the cylindrical portion 53a of the washer 53 is press-fitted onto the second end shaft portion 51 of the second lower bush 22 until the flange 53b of the washer 53 contacts the upper surface of the upper bracket 24, a clearance is formed between an outer circumferential surface of the cylindrical portion 53a of the washer 53 and the second fixing hole 46 of the upper bracket 24, and a clearance is formed between an edge surface of the cylindrical portion 53a facing opposite from the flange 53b and an end surface (i.e. the upper surface) of the strain generating body 20. In other words, the washer 53 does not contact the strain generating body 20. Accordingly, a position of the second end fixing portion 44 of the upper bracket 24 is not limited relative to the second lower bush 22, and the upper bracket 24 is integrally connected to the strain generating body 20 by means of the washer 53 that is press-fitted onto the second end shaft portion 51 of the second lower bush 22.

As a result, even in a case where a pitch between the first and second lower bushes 21 and 22 (i.e. a pitch between the first end hole 30 and the second end hole 35 of the strain generating body 20) does not correspond to a pitch between the first fixing hole 45 and the second fixing hole 46 of the upper bracket 24, in which the first end fixing portion 43 and the second end fixing portion 44 are integrally connected by means of the attachment portion 47, the first and second end fixing portions 43 and 44 of the upper bracket 24 are surely fixed on the strain generating body 20 without applying an internal stress thereto, so that the load applied by the occupant is accurately measured, As illustrated in FIG. 6, a connecting surface 62 is formed so as to face the attachment surface 18 of each of the upper rail 16 arranged at each of the left and right sides of the seat frame 17 of the vehicle seat 11 in an up-and-down direction. A connecting hole 63, through which the connecting shaft 23 of the load detection device 10 is inserted, and a first and second insertion holes 64, through which a first and second clamp nuts 60 are inserted respectively, are formed on the connecting surface 62. The connecting hole 63 is located between the insertion holes 64 and 64 with a predetermined space.

A procedure for mounting the load detection device 10 assembled as illustrated in FIGS. 2 and 5 between each of the pair of upper rails 16 of the seat slide apparatus 13 and the seat frame 17 of the vehicle seat 11 under each of four corners of a lower surface of the vehicle seat 11 will be described below. Each of the load detection devices 10 is arranged in a manner where: the strain generating body 20 is interposed between the attachment surface 18 of the upper rail 16 and the connecting surface 62 of the seat frame 17; the amplifier 27 is arranged at an inner side portion of the upper rail 16, i.e. at a position inwardly offset in the left-right direction of the vehicle seat 11 from a position where the attachment surface 18 of the upper rail 16 and the connecting surface 62 of the seat frame 17 oppose each other; and the connector 59 is arranged so as to face the electronic control unit fixed on the floor 12 under substantially a center portion of the vehicle seat 11 so that the connector 59 faces to the other connector 59 of the load detection device 10 arranged on the same attachment surface 18 of the upper rail 16 under the other corner of the lower surface of the vehicle seat 11 in the front-rear direction of the vehicle. The inner side portion of each of the upper rails 16 refers to a side or portion facing the other upper rail 16.

Four of the load detection devices 10 are attached between the pair of upper rails 16 and the seat frame 17 substantially in the same manner. Therefore, the attachment of the load detection devices 10 will be explained with one of the four load detection devices 10 as an example. However, the arrangement of the amplifiers 27 relative to the corresponding strain generating bodies 20 differ from each other in the left-right direction and in the front-rear direction of the vehicle seat 11. More specifically, each of the amplifiers 27 is arranged at the inner side in the left-right direction of the vehicle seat 11 relative to each of the strain generating bodies 20, which is arranged between the attachment surface 18 of the upper rail 16 and the connecting surface 62 of the seat frame 17. Further, each of the connectors 59 is arranged so as to face to the other connector 59, provided at the same upper rail 16, relative to each of the amplifiers 27 in the front-rear direction of the vehicle seat 11. Accordingly, the load detection devices 10 having the same arrangement are provided at the front-left side and the rear-right side of the vehicle seat 11, respectively, and the load detection devices 10 having the same arrangement are provided at the front-right side and the rear-left side of the vehicle seat 11, respectively. Hence, the load detection devices 10 having the same structure are arranged in two different ways on the upper rails 16.

Each of the first attachment hole 33 of the first lower bush 21 and the second attachment hole 37 of the second lower bush 22 is fitted onto each of the first and second fixing shafts 19 provided on each end portion of each of the upper rails 16, and bottom surfaces of the first base portion 29 and the second base portion 34 are placed on the attachment surface 18. The first clamp nut 60, screwed onto a first screw portion at the end portion of the first fixing shaft 19, presses the first end fixing portion 43 of the upper bracket 24 toward the strain generating body 20, and the second clamp nut 60, screwed onto a second screw portion at the end portion of the second fixing shaft 19, presses the second end fixing portion 44 toward the strain generating body 20, via the washer 53. As a result, the strain generating body 20 of the load detection device 10 is fixed on the attachment surface 18 of the upper rail 16 at the end portions of the strain generating body 20.

The connecting surface 62 having the connecting holes 63 is formed on the seat frame 17 of the vehicle seat 11. The fixing screw portion 42 of the connecting shaft 23 is fit into the corresponding connecting hole 63. Accordingly, a lower surface of the connecting surface 62 contacts upper surfaces of the ring members 48, and the seat frame 17 is set on the upper rails 16 via the strain generating bodies 20, the first and second lower bushes 21 and 22. Then, the connecting surface 62 is fixed on the ring members 48 by means of a clamp nuts 65 screwed onto the corresponding fixing screw portions 42. As a result, the connecting shafts 23 of the load detection devices 10 are fixed on the seat frame 17 of the vehicle seat 11.

In the seat apparatus for the vehicle including the load detection devices 10 having the above-described structure, when the occupant is seated on the seat cushion, the load applied by the occupant acts on the strain generating bodies 20 via the connecting shafts 23. As a result, the center portion of each of the strain generating bodies 20, whose end portions are supported by the first and second lower bushes 21 and 22, is deformed. When each strain generating body 20 is deformed, the strain is generated on the surface of the strain generating body 20 between the first lower bush 21 and the connecting shaft 23, and between the second lower bush 22 and the connecting shaft 23 in proportional to the load applied to the strain generating body 20. More specifically, when the strain generating body 20 is deformed, the compressive strain is generated on the surface of the strain generating body 20 towards the first and second lower bushes 21 and 22 and the tensile strain is generated towards the connecting shaft 23 in proportional to the load applied to the strain generating body 20. The compressive strain and the tensile strain are detected by the first and second strain gauges G1 and G2 attached on each of the strain generating bodies 20. Detection outputs of the first and second strain gauges G1 and G2 are amplified by the amplifier 27, and an output of the amplifier 27 is transmitted to the electronic control unit via the communication line connected to the connector 59. Accordingly, the load applied by the occupant seated on the vehicle seat 11 is measured on the basis of the strain generated on the strain generating bodies 20. Moreover, an airbag and the like is appropriately controlled in response to the weight of the occupant on the basis of the load detection result.

Second Embodiment

FIG. 7 illustrates a second embodiment of the load detection device 10. The load detection device 10 of the second embodiment differs from the load detection device 10 of the first embodiment in that the washer 53 having the flange 53b for fixing the second end fixing portion 44 of the upper bracket 24 on the strain generating body 20 is modified so to as to have a simple ring-shape. Hence, in the second embodiment, only the differences between the first and second embodiments will be described below. Further, in the second embodiment, identical or similar parts or elements are generally denoted by like reference numerals. In the second embodiment, the description of the identical or the same element with the first embodiment will be omitted.

In the second embodiment, as illustrated in FIG. 7, a recessed portion 44a having a predetermined depth is formed on the upper surface of the second end fixing portion 44 of the upper bracket 24, into which the second end shaft portion 51 of the second lower bush 22 is inserted. An inner surface of a ring-shaped washer 153, which has a ring portion and is accommodatable in the recessed portion 44a, is press-fitted onto the outer circumferential surface of the second end shaft portion 51 of the second lower bush 22 up to a position at which an edge circumferential surface of the washer 153 contacts a bottom surface of the recessed portion 44a. In this case, a clearance is created between an outer circumferential surface of the ring-shaped washer 153 and an inner circumferential surface of the recessed portion 44a of the upper bracket 24.

Accordingly, as is the case with the first embodiment, the second end fixing portion 44 of the upper bracket 24 is integrally connected to the strain generating body 20 by means of the ring-shaped washer 153 being press-fitted onto the second end shaft portion 51 of the second lower bush 22, while the position of the second end fixing portion 44 of the upper bracket 24 is not limited relative to the second lower bush 22.

Third Embodiment

FIG. 8 illustrates a third embodiment of the load detection device 10. The load detection device 10 of the third embodiment differs from the load detection device 10 of the first and second embodiments in that the second end fixing portion 44 of the upper bracket 24 is integrally connectable to the strain generating body 20 without any additional process on the upper bracket 24.

In the second embodiment, as illustrated in FIG. 8, each of the first end shaft portion 32 of the first lower bush 21 and the second end shaft portion 51 of the second lower bush 22 is formed to have a length so as to protrude from the upper surface of the upper bracket 24. An inner circumferential surface of a disk-shaped washer 253 having a ring portion is press-fitted onto the outer circumferential surface of the second end shaft portion 51 of the second lower bush 22 protruding from the second end fixing portion 44 of the upper bracket 24 up to a position at which an edge circumferential surface of the washer 253 contacts the upper surface of the second end fixing portion 44.

Additionally, in the third embodiment, the second lower bush 22 is formed to have the same shape as the first lower bush 21. More specifically, the first end shaft portion 32 of the first lower bush 21 also protrudes from the upper surface of the upper bracket 24. Therefore, as illustrated in FIG. 8, a seating surface of the first clamp nut 60, screwed onto the screw portion of the first fixing shaft 19 (see FIG. 6) fixing the first end fixing portion 43 of the upper bracket 24, is formed to have a shape in such a manner that the diameter of the seating surface is gradually increased toward the strain generating body 20. In the third embodiment, in order to standardize the clamp nuts 60, the second clamp nut 60 screwed onto the screw portion of the second fixing shaft 19 (see FIG. 6) for fixing the second end fixing portion 44 of the upper bracket 24 via the washer 253, is formed to have the same shape and size as the first clamp nut 60.

According to the first embodiment, each load detection device 10 includes the upper bracket 24, which has the first and second end fixing portions 43 and 44 connected to each other via the attachment portion 47, the first fixing hole 45 formed on the first end fixing portion 43 and press-fitted onto the first end shaft portion 32 of the first lower bush 21 and the second fixing hole 46 formed on the second end fixing portion 44 and loosely fitted onto the second end shaft portion 51 of the second lower bush 22. Further, each load detection device 10 includes the washer 53 having the flange 53b having the cylindrical portion 53a, which is press-fitted onto the second end shaft portion 51 of the second lower bush 22. Therefore, by press-fitting the cylindrical portion 53a of the washer 53 onto the second end shaft portion 51 of the second lower bush 22 until the flange portion 51b contacts the upper surface of the upper bracket 24, a dimensional error and the like is offset between the upper bracket 24 and the second lower bush 22 even if the upper bracket 24 having the integrally connected first and second end fixing portions 43 and 44 by the attachment portion 47, is employed. Further, by press-fitting the cylindrical portion 53a of the washer 53 onto the second end shaft portion 51 of the second lower bush 22 until the flange portion 51b contacts the upper surface of the upper bracket 24, the internal stress is less likely to act on the strain generating body 20 from the first and second lower bushes 21 and 22 and the like via the upper bracket 24. Therefore, even if the first and second end fixing portions 43 and 44 are integrally connected to each other by the attachment portion 47, the strain generating body 20 is surely fixed between the upper bracket 24 and the first and second lower bushes 21 and 22. Further, as the washer 53 does not contact the strain generating body 20, an external stress acting on the strain generating body 20 may be reduced.

According to the second embodiment, the recessed portion 44a for accommodating the washer 153 therewithin is formed on one of the first and second end fixing portions 43 and 44 of the upper bracket 24. The washer 153, accommodated within the recessed portion 44a, is press-fitted onto the second end shaft portion 51 of the second lower bush 22, so that one of the first and second end fixing portions 43 and 44 of the upper bracket 24 is held between the washer 153 and the second lower bush 22. Therefore, one of the first and second end fixing portions 43 and 44 of the upper bracket 24 is surely fixed on the second lower bush 22 by means of the washer 153, which is press-fitted onto the second end shaft portion 51 of the second lower bush 22.

According to the embodiments, the load applied by the occupant is accurately detected by arranging the load detection devices 10 having the above-described structure between the seat frame 17 (the seat supporting member) for fixing the vehicle seat 11 and the upper rails 16 (the mounting member) for fixing the seat frame 17 on the floor 12 of the vehicle.

According to the embodiments, the amplifier 27 is attached on the attachment portion 47, which integrally connects the first and second end fixing portions 43 and 44 of the upper bracket 24. Accordingly, the attachment portion 47 has advantages of reducing a number of components for forming the upper bracket 24. However, the attachment portion 47 is provided not only for attaching the amplifier 27 thereon.

According to the embodiments, the first and second lower bushes 21 and 22 are fixed on the upper rails 16 (the mounting member), and the connecting shaft 23 is fixed on the seat frame 17 (the seat supporting member). However, each load detection device 10 of the embodiments may be modified so that the first and second lower bushes 21 and 22 are fixed on the seat frame 17, and the connecting shaft 23 is fixed on the upper rail 16.

Accordingly, the dimensional error and the like is offset between the upper bracket 24 and the second lower bush 22 even if the upper brackets 24 having the integrally connected first and second end fixing portions 43 and 44, is employed. Further, the internal stress is less likely to act on the strain generating body 20 from the first and second lower bushes 21 and 22 and the like via the upper bracket 24. Therefore, even if the first and second end fixing portions 43 and 44 are integrally connected to each other is employed, the strain generating body 20 is surely fixed between the upper bracket 24 and the first and second lower bushes 21 and 22.

Accordingly to the embodiments, the washer 53 (153/253) does not contact the strain generating body 20.

Accordingly, as the washer 53 (153/253) does not contact the strain generating body 20, the external stress acting on the strain generating body 20 may be reduced.

Accordingly to the embodiments, the washer 53 includes the cylindrical portion 53a, which is press-fitted onto the second end shaft portion 51 of the second lower bush 22 and the flange 53 formed at one end of the cylindrical portion 53a and contacting the second end fixing portion 44 of the upper bracket 24.

Accordingly, the washer 53 includes the cylindrical portion 53a and the flange 53b formed on one end of the cylindrical portion 53a. The cylindrical portion 53a is press-fitted onto the second end shaft portion 51 of the second lower bush 22 so that the flange 53b contacts the surface of upper bracket 24. Therefore, one of the first and second end fixing portions 43 and 44 of the upper bracket 24 is surely fixed on the second lower bush 22 by means of the washer 53, which is press-fitted onto the second end shaft portion 51 of the second lower bush 22.

According to the embodiments, the first lower bush 21 and the second lower bush 22 are formed to have the same shape.

Accordingly, the second lower bush 22 is formed to have the same shape and size as the first lower bush 21. Therefore, a same designed or shaped lower bush is commonly used as the first and second lower bushes 21 and 22.

According to the embodiments, the load detection device 10 includes the signal processing unit for processing the detection output of the first and second strain gauges G1 and G2. The upper bracket 24 further includes an attachment portion 47 for integrally connecting the first end fixing portion 43 and the second end fixing portion 44 and for attaching the upper bracket 24 at the signal processing unit 27.

Accordingly, the attachment portion 47 has advantages of reducing a number of components for forming the upper bracket 24.

According to the embodiments, the signal processing unit includes the amplifier 27 for amplifying the detection output of the first and second strain gauges G1 and G2.

Accordingly to the embodiments, the cylindrical portion 53a of the washer 53 is press-fitted onto the second lower bush 22 without contacting the strain generating body 20.

According to the embodiment, the outer diameter of the cylindrical portion 53a of the washer 53 is set to be smaller than the diameter of the second fixing hole 46 of the upper bracket 24.

According to the embodiments, the second fixing hole 46 of the upper bracket 24 is formed to have the larger diameter than the diameter of the first fixing hole 45.

According to the embodiments, the washer (153, 253) includes the ring portion, which is press-fitted onto the second end shaft portion 51 of the second lower bush 22, the ring portion contacts the second end fixing portion 44 of the upper bracket 24 and holds the second end fixing portion 44 between the ring portion and the second lower bush 22.

Accordingly, one of the first and second end fixing portions 43 and 44 of the upper bracket 24 is surely fixed on the second lower bush 22 by means of the washer 153 (253), which is press-fitted onto the second end shaft portion 51 of the second lower bush 22.

According to the embodiments, the seat supporting member includes the seat frame 17 for supporting a seat cushion of the seat for the vehicle thereon, the mounting member includes the lower rails 14, which is fixed on the floor 12 of the vehicle and extends in the front-rear direction of the vehicle, and the upper rails 16, which is movably supported by the respective lower rails 14, the first lower bush 21 and the second lower bush 22 are fixed on either one of the seat frame 17 and the upper rail 16, and the connecting shaft 23 is fixed on the other one of the seat frame 17 and the upper rail 16.

Accordingly, the dimensional error and the like is offset between the upper bracket 24 and the second lower bush 22 even if the upper brackets 24 having the integrally connected first and second end fixing portions 43 and 44, is employed. Further, the internal stress is less likely to act on the strain generating body 20 from the first and second lower bushes 21 and 22 and the like via the upper bracket 24. Therefore, even if the first and second end fixing portions 43 and 44 are integrally connected to each other is employed, the strain generating body 20 is surely fixed between the upper bracket 24 and the first and second lower bushes 21 and 22.

According to the embodiments, the load detection device 10 includes the signal processing unit 27 for processing the detection output of the first and second strain gauges G1 and G2. Further, the upper bracket 24 further includes the attachment portion 47 for integrally connecting the first end fixing portion 43 and the second end fixing portion 44 and for attaching the upper bracket 24 at the signal processing unit 27.

Accordingly, the attachment portion 47 has advantages of reducing a number of components for forming the upper bracket 24.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A load detection device adapted to a seat for a vehicle, interposed between a seat supporting member for supporting the seat and a mounting member for mounting the seat supporting member on a floor of the vehicle and measuring a load applied by an occupant seated on the seat for the vehicle, the load detection device comprising:

a strain generating body having a first hole at a first end of the strain generating body and a second hole at a second end of the strain generating body;

a strain gauge attached on the strain generating body;

a first fixing member having a first middle shaft portion, which is press-fitted into the first hole, and a first end shaft portion, which protrudes from the first middle shaft portion, the first fixing member adapted to be connected to one of the seat supporting member and the mounting member;

a second fixing member having a second middle shaft portion, which is press-fitted into the second hole, and a second end shaft portion, which protrudes from the second middle shaft portion, the second fixing member adapted to be connected to the one of the seat supporting member and the mounting member;

a bracket member having a first fixing portion, including a first fixing hole, at a first end of the bracket member and a second fixing portion, integrally connected to the first fixing portion and including a second fixing hole, at a second end of the bracket member, the first end shaft portion of the first fixing member being press-fitted into the first fixing hole of the bracket member and the second end shaft portion of the second fixing member being inserted into the second fixing hole of the bracket member with a clearance between the second end shaft portion and the second fixing hole;

a press-fit fixing member press-fitted onto the second end shaft portion of the second fixing member for holding the second fixing portion of the bracket member between the press-fit fixing member and the second fixing member; and a connecting shaft integrally connected to the strain generating body between the first hole and the second hole of the strain generating body and adapted to be connected to the other of the seat supporting member and the mounting member.

2. The load detection device according to claim 1, wherein the press-fit fixing member does not contact the strain generating body.

3. The load detection device according to claim 1, wherein the press-fit fixing member includes a cylindrical portion, which is press-fitted onto the second end shaft portion of the second fixing member and a flange portion formed at one end of the cylindrical portion and contacting the second fixing portion of the bracket member.

4. The load detection device according to claim 1, wherein the first fixing member and the second fixing member are formed to have the same shape.

5. The load detection device according to claim 1 further including a signal processing unit that processes a detection output of the strain gauge, wherein the bracket member further includes an attachment portion for integrally connecting the first fixing portion and the second fixing portion and for attaching the bracket member at the signal processing unit.

6. The load detection device according to claim 5, wherein the signal processing unit includes an amplifier that amplifies the detection output of the strain gauge.

7. The load detection device according to claim 3, wherein the cylindrical portion of the press-fit fixing member is press-fitted onto the second fixing member without contacting the strain generating body.

8. The load detection device according to claim 3, wherein an outer diameter of the cylindrical portion of the press-fit fixing member is set to be smaller than a diameter of the second fixing hole of the bracket member.

9. The load detection device according to claim 4, wherein the second fixing hole of the bracket member is formed to have a larger diameter than a diameter of the first fixing hole.

10. The load detection device according to claim 1, wherein the press-fit fixing member includes a ring portion, which is press-fitted onto the second end shaft portion of the second fixing member, the ring portion contacts the second fixing portion of the bracket member and holds the second fixing portion between the ring portion and the second fixing member.

11. The load detection device according to claim 1, wherein the seat supporting member includes a seat frame that supports a seat cushion of the seat for the vehicle, the mounting member includes a lower rail, which is fixed on the floor of the vehicle and extends in a front-rear direction of the vehicle, and an upper rail, which is movably supported by the lower rail, the first fixing member and the second fixing member are fixed on either one of the seat frame and the upper rail, and the connecting shaft is fixed on the other one of the seat frame and the upper rail.

12. A load detection device, comprising:
a strain generating body having a first hole at a first end of the strain generating body and a second hole at a second end of the strain generating body;
a strain gauge attached on the strain generating body;
a first fixing member having a first middle shaft portion, which is press-fitted into the first hole, and a first end shaft portion, which protrudes from the first middle shaft portion;
a second fixing member having a second middle shaft portion, which is press-fitted into the second hole, and a second end shaft portion, which protrudes from the second middle shaft portion;
a bracket member having a first fixing portion, including a first fixing hole, at a first end of the bracket member and a second fixing portion, integrally connected to the first fixing portion and including a second fixing hole, at a second end of the bracket member, the first end shaft portion of the first fixing member being press-fitted into the first fixing hole of the bracket member and the second end shaft portion of the second fixing member being inserted into the second fixing hole of the bracket member with a clearance between the second end shaft portion and the second fixing hole;
a press-fit fixing member press-fitted onto the second end shaft portion of the second fixing member for holding the second fixing portion of the bracket member between the press-fit fixing member and the second fixing member; and
a connecting shaft integrally connected to the strain generating body between the first hole and the second hole of the strain generating body.

13. The load detection device according to claim 12 further including a signal processing unit that processes a detection output of the strain gauge, wherein the bracket member further includes an attachment portion for integrally connecting the first fixing portion and the second fixing portion and for attaching the bracket member at the signal processing unit.

* * * * *